United States Patent [19]

Arzenti et al.

[11] Patent Number: 4,829,648

[45] Date of Patent: May 16, 1989

[54] APPARATUS AND METHOD FOR SIMULTANEOUSLY LOADING A REINFORCING SLEEVE AND MANDREL INTO A TUBE

[75] Inventors: Thomas E. Arzenti, Munhall; William E. Pirl, Level Green; Annette M. Costlow, Plum Borough, all of Pa.

[73] Assignee: Westinghouse Electric Corp., Pittsburgh, Pa.

[21] Appl. No.: 6,845

[22] Filed: Jan. 27, 1987

[51] Int. Cl.[4] .................................................. B21D 53/00
[52] U.S. Cl. ..................................... 29/157.4; 29/252; 29/723; 29/726; 29/906; 165/11.2; 254/29 R; 376/260; 376/271
[58] Field of Search .................. 29/157.4, 906, 402.09, 29/723, 726, 157.3, 234, 244, 252, 282, 720, 721; 165/11.2; 376/260, 261, 262, 264, 271, 228, 249; 138/97; 254/29 B, 106

[56] References Cited

U.S. PATENT DOCUMENTS

| | | | |
|---|---|---|---|
| 4,216,893 | 8/1980 | Glatthorn | 29/726 X |
| 4,406,856 | 9/1983 | Wilkins et al. | 29/727 |
| 4,410,210 | 10/1983 | de Sivry et al. | 294/119.3 |
| 4,479,547 | 10/1984 | Boyadjeff et al. | 254/29 R X |
| 4,543,711 | 10/1985 | Wada et al. | 29/726 |
| 4,567,631 | 2/1986 | Kelly | 29/157.4 X |
| 4,580,426 | 4/1986 | Zafred | 72/58 |
| 4,586,250 | 5/1986 | Cooper, Jr. et al. | 29/400 N X |
| 4,649,989 | 3/1987 | Vermadt et al. | 165/11.2 |
| 4,653,164 | 3/1987 | Cooper, Jr. et al. | 29/723 X |
| 4,728,217 | 3/1988 | Fink | 29/252 X |

Primary Examiner—Mark Rosenbaum
Assistant Examiner—Frances Chin

[57] ABSTRACT

An apparatus and method for remotely inserting and positioning a sleeve-loaded mandrel within a damaged tube mounted in the tubesheet of a nuclear steam generator is disclosed herein. The apparatus of the invention generally comprises a frame, a mounting mechanism for detachably and pivotally mounting the frame to the open end of one of a first tube in the tubesheet, an advancing assembly supported by the frame for remotely inserting and advancing the sleeve-loaded mandrel to a position across a damaged section of the selected tube, and a drive train for pivotally positioning the advancing assembly into alignment with the open end of the selected tube. In the preferred embodiment, the advancing means is formed from the pair of hydraulically operated grippers, one of which is reciprocably movable with respect to the other. Additionally, the mounting mechanism inlcudes a double-action hydraulic cylinder that is capable of translating the frame into engagement with the tubesheet after the advancing assembly has been pivoted into alignment with the damaged tube. In the method of the invention, the first tube is chosen so that the advancement assembly may be pivoted into position under two or more tubes that need to be sleeved.

32 Claims, 4 Drawing Sheets

APPARATUS AND METHOD FOR SIMULTANEOUSLY LOADING A REINFORCING SLEEVE AND MANDREL INTO A TUBE

BACKGROUND OF THE INVENTION

1. Field of the Invention

This invention relates to an apparatus and method for simultaneously loading a reinforcing sleeve and expansion mandrel into a heat exchange tube in order to expedite the installation of the reinforcing sleeve within the tube.

2. Description of the Prior Art

Devices for positioning reinforcing sleeves within the heat exchange tubes of steam generators are known in the prior art. One such device developed by the personnel of the Westinghouse Electric Corporation is capable of feeding such reinforcing sleeves through the open ends of the tubesheet of a nuclear steam generator by means of a pair of hydraulic grippers, each of which includes an expandable bladder. The frame of this device is light enough to allow it to be manipulated within the radioactive, primary side of a nuclear steam generator by a remotely operable service arm (or ROSA) that has also been invented and developed by personnel of the Westinghouse Electric Corporation. Once situated, the sleeve-feeding mechanism of this device is locked into position adjacent to the sleeve to be repaired by one or more hydraulically operated cam-lock devices that are insertable within and expandable against the open ends of tubes that are not being repaired. After the device has been secured into a proper position, the hydraulic grippers are actuated. The feeding of the sleeve is accomplished by alternatively actuating and deactuating the hydraulic grippers, and by reciprocating one of the grippers relative to the other. A complete description of this sleeve loading mechanism is set forth in U.S. patent application Ser. No. 785,291 filed Oct. 3, 1985, by Thomas E. Arzenti and William E. Pirl, now U.S. Pat No. 4,711,526, and a complete description of a hydraulically operated camlock device for mounting such tools within such steam generators is described in U.S. patent application Ser. No. 832,940 filed Feb. 26, 1986 by David J. Fink. Both of these applications are assigned to the Westinghouse Electric Corporation, and both are completely incorporated herein by reference.

Generally speaking, the ultimate purpose of such maintenance devices is to prevent radioactive water from the primary side of the generator from breaking through the weakened walls of corroded heat exchange tubes. If such a break should occur, radioactive water from the primary side would contaminate the non-radioactive water present in the secondary side of the generator. Since the water in the secondary side is used to form the steam which ultimately drives the electric turbines in the plant, it is important that this water remain uncontaminated. However, before the utility of such devices can be specifically appreciated, a more detailed understanding of the structure and maintenance of nuclear steam generators is necessary.

Nuclear steam generators are comprised of three principal parts, including a primary side, a tubesheet in which a bundle of U-shaped tubes are mounted, and a secondary side. The tubesheet and U-shaped tubes hydraulically isolate the primary and the secondary sides of the steam generator while thermally connecting them together, so that heat from the radioactive water in the primary side is transferred to the non-radioactive water in the secondary side. This heat transfer is accomplished by the U-shaped tubes mounted in the tubesheet that extend throughout the secondary side of the steam generator. The inlet and outlet ends of these U-shaped tubes are mounted in the side of the tubesheet that faces the primary side of the generator. The primary side in turn includes a divider plate that hydraulically isolates the inlet ends of the U-shaped tubes from the outlet ends. Hot, radioactive water heated by the nuclear reactor is admitted into the section of the primary side containing all the inlet ends of the U-shaped tubes. This hot water flows through these inlets, up through the tubesheet, and circulates around the U-shaped tubes that extend within the secondary side of the steam generator. This hot, radioactive water transfers its heat through the walls of the U-shaped tubes to the non-radioactive water that surrounds the tubes in the secondary side of the generator, thereby converting this feed water into non-radioactive steam. After the nuclear-heated water circulates through the U-shaped tubes, it flows back through the tubesheet, through the outlets of the U-shaped tubes, where it is ultimately circulated back to the nuclear reactor. The use of such a heat exchanger as a hydraulic interface between the nuclear core and the steam used to turn the generators advantageously confines the radioactivity generated by the core to a relatively small region of the plant.

Over long periods of time, the heat exchanger tubes of such nuclear steam generators can suffer a number of different types of corrosion degradation, including intragranular stress corrosion cracking. In situ examination of the tubes within these generators has revealed that most of this intragranular stress corrosion cracking occurs around the tubesheet region of the generator, where the inlet and outlet ends of the U-shaped tubes extend through the bores in the tubesheet. Often there is some annular space between the outer walls of the tubes and the walls of the tube-receiving bores in the tubesheet. Experience has shown that potentially corrosive sludges can accumulate on the upper surface of the tubesheet and flow down into these annular spaces over long periods of time. To prevent these potentially corrosive sludges from collecting within these annular spaces from the effect of gravity, the heat exchange tubes are often radially expanded by means of a mechanical or hydraulic mandrel to minimize the clearance between the outer walls of the tubes and the inner walls of the bores in the tubesheet through which they extend. However, some of these potentially corrosive sludges can still collect in the very small annular spaces between the tubes and the bores of the tubesheets that are left after the tubes are expanded. Moreover, the relatively poor hydraulic circulation of the water in these regions tends to maintain the sludge in these spaces and to create localized "hot spots" in the tubes adjacent the sludge. The heat radiating from these "hot spots" may assist in the corrosion processes that operate on the exterior surfaces of the heat exchange tubes in chemical combination with the corrosive species in the sludge. While most nuclear steam generators include blow-down systems for periodically sweeping the sludge out of the generator vessel, the sludges in the annular crevice regions are not easily swept away. Despite the fact that the heat exchange tubes of such nuclear steam generators are typically formed from corrosion-resistant Inconel ®, the constant exposure to corrosive sludges and heat, in combination with the mechanical stresses induced in these walls as a result of the hydraulic or mechanical expansion, can ultimately cause the heat-exchange tubes to corrode and crack due to intragranular stress corrosion. This, in turn, can allow radioactive water from the primary side of the steam generator to leak into the secondary side, thereby radioactively contaminating the steam produced by the generator.

Such radioactive contamination of the generator steam can be avoided if certain maintenance procedures, such as tube sleeving, are undertaken before the walls of the tubes crack. In such sleeving operations, a reinforcing sleeve is slid up the heat exchanger tubes in the sections of the tubes surrounded by the tubesheet, and then hydraulically expanded and rolled into the inner walls of the tubes. The end result is that the sleeve forms a fluid "bridge" across the weakened walls of the repaired heat exchange tube.

Such sleeving operations have proven to be very effective in extending the useful lifetime of the nuclear steam generator. Unfortunately, they are also quite expensive since the steam generator has to be completely shut down and taken off-line. Such downtime can cost the utility involved over $500,000 per day. It is therefore desirable that such sleeving operations be accomplished as rapidly as possible. While the sleeve loading tool described and claimed in the previously mentioned U.S. patent application Ser. No. 785,291 is among the fastest and most effective tools known for positioning reinforcing sleeves across corroded sections of heat exchanger tubes, it has several design limitations that prevent it from positioning as many sleeves as possible within a given unit of time. For example, the entire tool must be robotically re-positioned in the tubesheet whenever a new tube is to be sleeved. Additionally, as this tool is only capable of positioning a sleeve and not a hydraulic expansion mandrel, the maintenance operator must separately position the mandrel within the sleeve after the sleeve has been properly positioned. The separate positioning of first the sleeve and then the mandrel is time consuming, and causes the maintenance operator to be exposed to a significant dose of radiation.

Clearly, there is a need for improved sleeving devices capable of installing reinforcing sleeves in heat exchanger tubes in shorter time periods. Ideally, such a device should be easily and remotely manipulable within the radioactive environment of the primary side of the generator by means of commercially available robotic arms. Finally, it would be desirable if the operation of the device somehow combined the sequential steps of first positioning the sleeve and then positioning the mandrel so that the entire operation was substantially accelerated, and the maintenance operator's exposure to potentially harmful radiation was minimized.

SUMMARY OF THE INVENTION

Generally speaking, the invention is a tool for remotely inserting and positioning an elongated maintenance component, such as a sleeve-loaded expansion mandrel, across the damaged section of a tube in a tubesheet. The tool comprises a frame, a mounting means for detachably and pivotally mounting the frame to a first tube in the tubesheet, an advancing assembly supported by the frame for remotely inserting and advancing the sleeve-loaded mandrel to a selected axial position within the tube, and a drive means for pivotally positioning the advancing assembly into alignment with the open end of the selected tube.

The mounting means includes both a securing collet capable of expandably locking itself within the open end of the first tube, and a bearing for pivotally mounting the securing means to the frame. In the preferred embodiment, the securing collet is part of a hydraulically expandable cam-lock device. This expandable cam-lock includes a displacement means in the form of a double-action hydraulic cylinder for selectively moving the frame from a noncontacting to a contacting position with respect to the tubesheet. This displacement means allows the advancing assembly to be freely pivoted into alignment without mechanical interference during the alignment operation, and then abutted against the open end of the selected tube once alignment therewith has been achieved.

The advancing assembly may include upper and lower grippers, the lower of which is reciprocably movable with respect to the upper in order to incrementally advance the sleeve-loaded mandrel to a desired axial position within the tube to be repaired. Each of the grippers may further include a resilient bladder that is selectively expandable into engagement with the sleeve that circumscribes the mandrel. The upper and lower grippers are preferably maintained in alignment with one another by means of guide rods, and a double-action hydraulic cylinder is preferably utilized to reciprocate the lower gripper with respect to the upper gripper, which is mounted on a support plate of the frame.

The drive means may include the combination of a gear train and an electric motor. In the preferred embodiment, one of the gears of the gear train is concentrically disposed around both the securing mechanism and the bearing. The balance of the gear train is configured so that when the electric motor is actuated, the entire frame rotates about the bearing, thereby pivotally moving the advancing assembly in a circular path around the tubesheet.

In operation, the sleeve and mandrel loading tool of the invention is remotely attached to the open end of a first tube in the tubesheet by robotically inserting the securing collet into the tube, and expanding it into engagement therewith. The first tube is chosen so that the distance between it and the selected damaged tube is the same as the radial distance between the upper gripper of the advancement assembly and the center line of the securing collet. After the securing collet is expandably attached to the open end of the first tube, the apparatus is remotely detached from its robotic arm, and the hydraulic cylinder of the displacement means is adjusted so that the frame does not come into mechanical contact with the tubesheet. The frame is then pivotally moved around the mounting means by actuating the motor of the drive train. When the upper gripper of the advancing assembly is aligned with the open end of the selected tube, the motor is de-actuated, and the hydraulic cylinder of the displacement means actuated so that the frame comes into contact with the tubesheet with the upper gripper in alignment with the open end of the selected tube. Outside of the primary side of the generator, a sleeve is slid over an expansion mandrel. Hydraulic fluid at low pressure is introduced into the mandrel to secure the sleeve onto the mandrel. The sleeve-loaded mandrel is next fed into the advancing mechanism by an operator who manually pushes the hydraulic hose of the mandrel through a guide hose that is aligned with the lower gripper. The advancing mechanism is then actuated so that the reciprocating bottom gripper, in co-action with the stationary top gripper, incrementally advances the sleeve-loaded mandrel to a desired position across the damaged portion of the selected tube. The mandrel is next actuated under high hydraulic pressure so that the reinforcing sleeve is expanded and secured into the walls of the damaged tube. The mandrel is then withdrawn by the advancing mechanism.

The combination of a securing mechanism that is pivotally mounted within the frame and a drive means for selectively pivoting the advancing assembly into alignment with a tube to be sleeved not only makes it easier for the operator of the robotic arm to position the tool on the tubesheet, but also largely obviates the need to re-mount the securing means in the tubesheet with every sleeving operation, since the advancing assembly can often be pivotally aligned with two or three tubes that need such sleeving from one pivot point. Additionally, as the sleeve and mandrel are positioned in a single step, the sleeving operation is greatly accelerated, and the radiation exposure to the maintenance operator is substantially reduced.

DETAILED DESCRIPTION OF THE PRIOR ART

General Overview of the Structure and Function of the Invention

Figure 1:
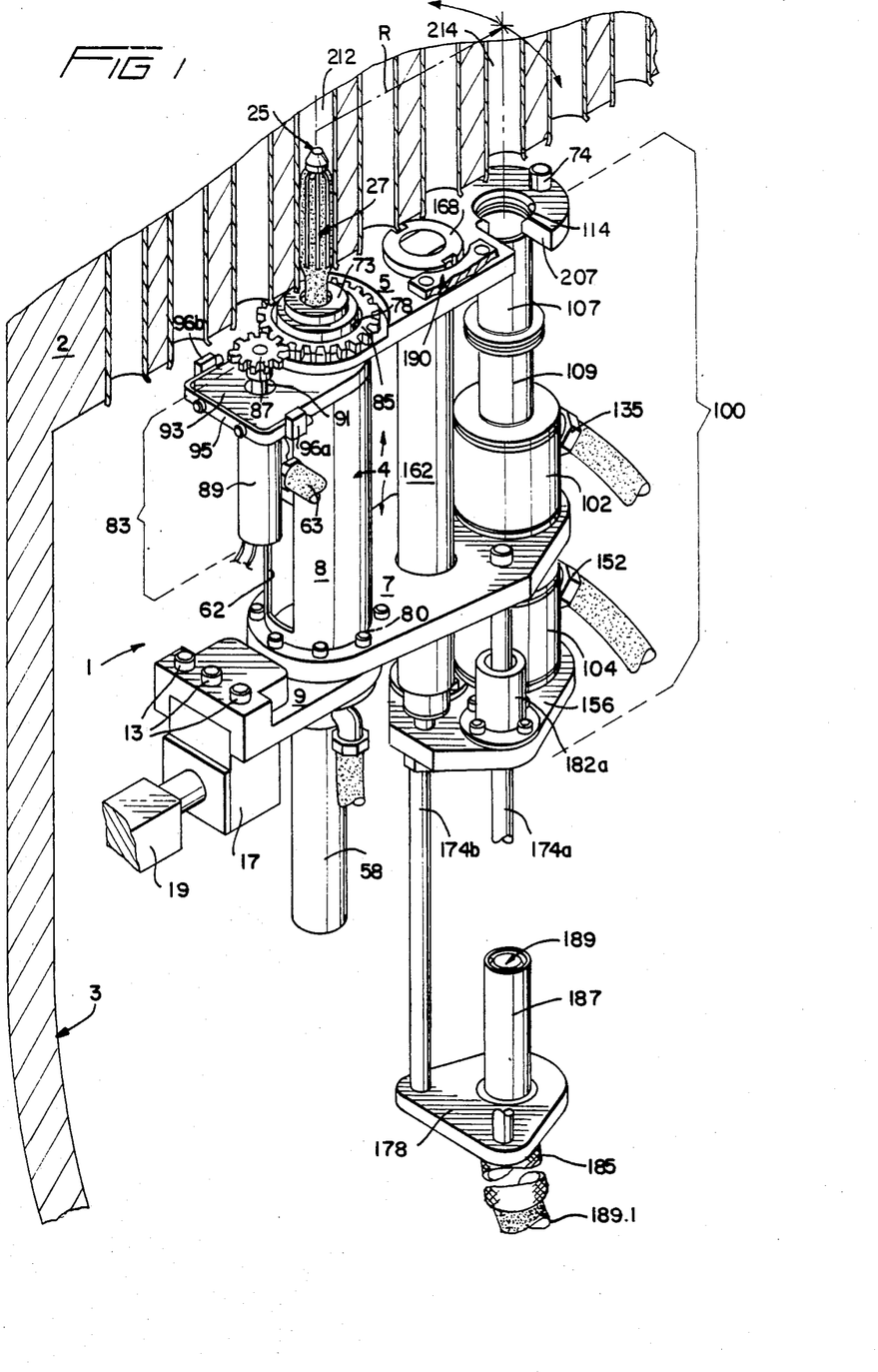
FIG. 1 is a perspective view of the sleeve and mandrel loading apparatus of the invention as it would appear installed onto the tubesheet of a nuclear steam generator.

With reference now to FIG. 1, wherein like numbers designate like components throughout all of the several figures, the general purpose of the sleeve and mandrel loading tool 1 of the invention is to install a sleeve in the tubesheet 2 of a nuclear steam generator 3. To that end, the tool 1 has a frame 4 formed from an upper support plate 5, a lower support plate 7, and a tubular housing 8. On one end of the upper support plate 5, a mounting mechanism 25 is provided that includes a hydraulically expandable securing collet 27. This collet 27 may be extended or retracted toward or away from the upper support plate 5 of the frame 4 by a translation cylinder 58 in order to move the frame 4 toward or away from a tubesheet 2 of a steam generator 3. Upper and lower ring-shaped bearings 78 and 80 circumscribe the mounting mechanism 25 in order to pivotally mount it within the upper and lower plates 5, 7 of the frame 4. On the upper plate 5, a drive train 83 is included for pivotally moving an advancing assembly 100 about the center axis of the securing collet 27 in order to position it under a desired tube 212.

The advancing assembly 100 includes an upper gripper 102 that is stationarily mounted beneath the upper support plate 5 on the end of the plate opposite to the mounting mechanism 25, as well as a lower gripper 104 that is reciprocably movable beneath the upper gripper 102 by means of a double-action hydraulic cylinder 162. Each of the grippers 102 and 104 includes a selectively expandable bladder 129 (shown in FIG. 2) that is formed from a resilient plastic. The bladder 129 expands into gripping contact with a sleeve-loaded mandrel 189 whenever pressurized air is introduced into its respective cylindrical housing. Because of the resiliency of the bladders 129, each of the grippers 102, 104 will disengage whatever portion of the sleeve-loaded mandrel 189 is disposed within it whenever the pressurized air is relieved therefrom. By alternatively pressurizing and relieving the air around the bladders 129 within the grippers 102, 104 while reciprocably moving the lower gripper 104 by means of the double-action cylinder 162, a sleeve-loaded mandrel 189 can be incrementally fed through the grippers 102, 104, through the top and bottom guide tubes 107 and 109, and finally out through the chamfered opening 114 located in the upper support plate 5.

In operation, a robotic arm 19 that is connected to the lower support plate 7 via mounting bracket 9 is used to remotely position the securing collet 27 into alignment with the open end of a first heat exchanger tube 212 located in the tubesheet 2. This heat exchanger tube 212 is chosen so that the distance R between it and the heat exchanger tube 214 to be sleeved is equal to the radial distance R between the center lines of the securing collet 27, and the chamfered opening 114 of the advancing assembly 100. Because the operator of the robotic arm 19 need not concern himself at this juncture with precisely aligning the advancing assembly 100 under the tube 214 to be sleeved, the initial positioning step of the invention is far easier than prior art methods where the robotic arm had to simultaneously insert a camlock in one tube while precisely aligning the working end of the tool with the tube to be sleeved. After the securing collet 27 has been so positioned, the robotic arm 19 is used to move the tool 1 upwardly in order to insert the expandable end of the collet 27 into the open end of the heat exchanger tube 212. The collet 27 is then secured into locking engagement with the interior surface of this tube 212 by pulling a cam actuator 31 downwardly via hydraulic cylinder 47 (see FIG. 4). Once the tool 1 has been so secured, the robotic arm 19 is de-coupled from the mounting bracket 9 of the lower support plate 7 in a manner which will be explained in more detail hereinafter. Next, the drive train 83 is actuated in order to pivot the frame 4 about the center line of the securing collet 27 until the chamfered opening 114 of the advancing assembly 100 is in precise alignment with the open end of the tube 214 to be sleeved. Tool 1 is then pulled upwardly into the servicing position illustrated in FIG. 1 by actuating the hydraulic cylinder 58, which in turn pulls the securing collet 27 downwardly via rod 56 until the spacing collar 73 and spacing lug 74 engage the tubesheet 2. Finally, a mandrel 189 loaded with a sleeve 187 is manually slid through a braided stainless steel guide tube 185 until it is gripped by the reciprocating lower gripper 104 of the advancing mechanism 100. The sleeve-loaded mandrel 189 is then incrementally advanced into the tube 214 to be sleeved until the advancing mechanism 100 inserts the desired distance along the longitudinal axis of the tube 214. The mandrel 189 is then used to expand the sleeve 187 into a desired position in order to build a hydraulic "bridge" across the weakened portion 214. If the operator chooses his mounting tube 212 carefully so that other tubes that need sleeving are also located the distance R from the securing collet 27, two or three tubes may be sleeved before it is necessary to move the tool 1 to another position by the robotic arm 19.

Specific Description of the Structure and Operation of the Invention

Figure 2:
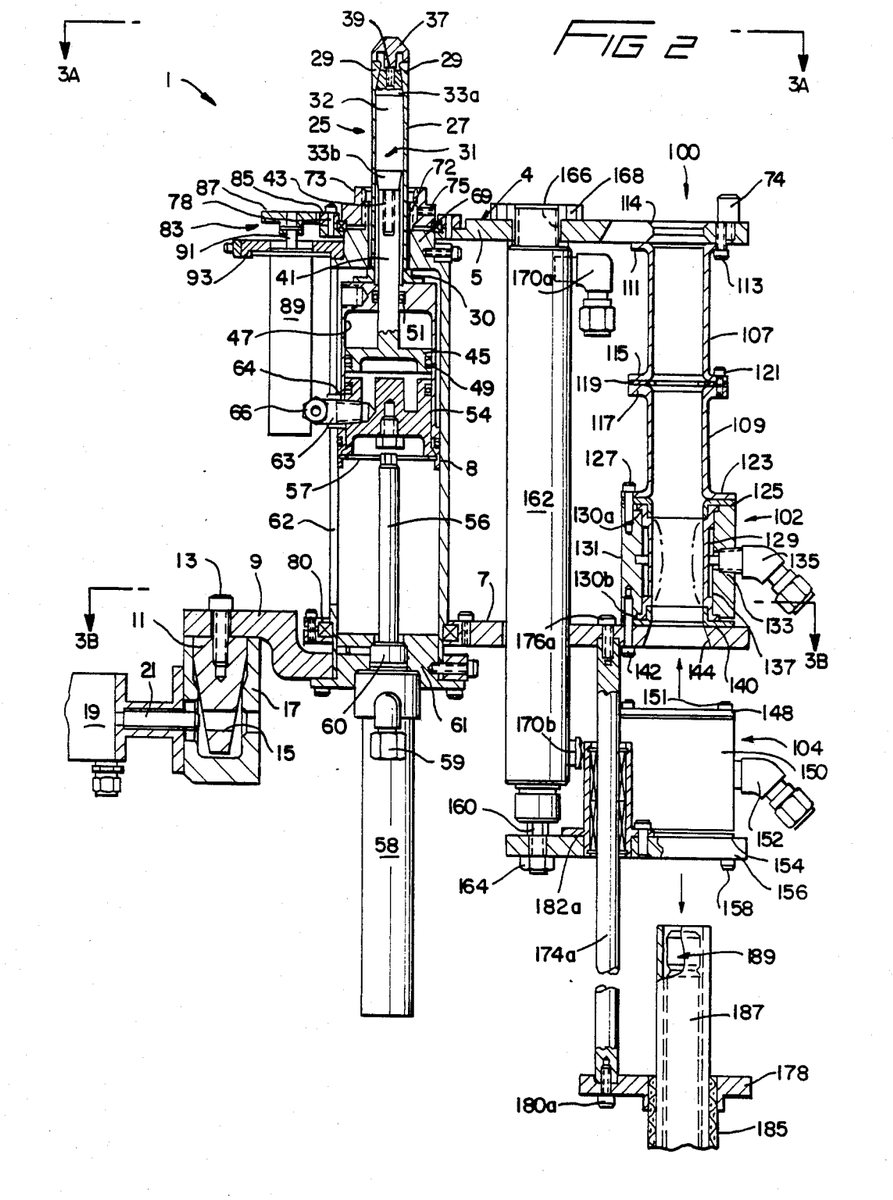
FIG. 2 is cross-sectional side view of the sleeve and mandrel loading apparatus of the invention.

With reference now to FIG. 2, the frame 4 of the sleeve and mandrel loading tool 1 includes both the previously mentioned upper and lower support plates 5 and 7 that are interconnected by the tubular housing 8, and a mounting bracket 9 that holds a wedge 11 for selectively connecting and disconnecting the tool 1 from the previously mentioned robotic arm 19. The wedge 11 is secured onto the mounting bracket 9 by means of a bolt 13 as shown. The wedge includes a laterally oriented, pin-receiving bore 15. The robotic arm 19 includes a cup 17 for receiving the wedge 11, as well as a locking pin 21 that is extendable transversely across the cup 17 by means of a double-action hydraulic cylinder (not shown). When so extended, the locking pin 21 is received into the pin receiving bore 15. The use of a hydraulically actuated "latch" formed from the cooperation between the locking pin 21 and the transverse bore 15 in the wedge 11 constitutes a highly reliable and remotely operable coupling and de-coupling mechanism between the tool 1 and the robotic arm 19. Additionally, the combination of the wedge 11 and cup 17 form a coupling mechanism that is easily re-engageable by the operator of the robotic arm 19 by merely "catching" the tapered point of the wedge 11 anywhere within the open end of the cup 17. In the preferred embodiment, the specific robotic arm 19 used is a No. 51-1-13 SM-10W series arm manufactured by Zetec, Inc. located in Issaquam, Wash. Finally, in order to minimize the stress on the arm 19, all parts of the frame 4 are formed from a lightweight metal such as aluminum.

Figures 3A, 3B:
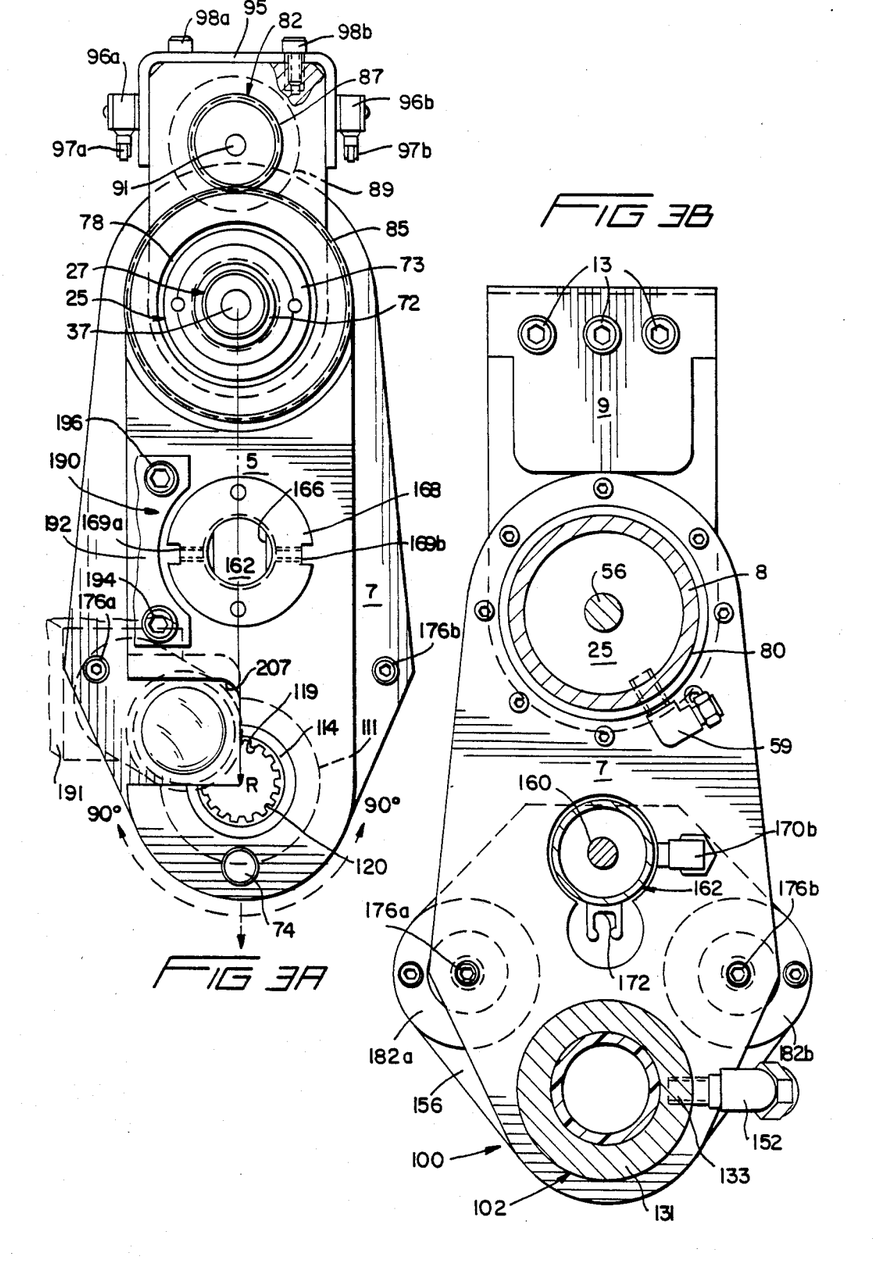
FIG. 3A is a plan view of the apparatus illustrated in FIG. 2 (with the reciprocating plate removed for clarity) along the line 3A—3A.
FIG. 3B is a cross-sectional plan view of the apparatus illustrated in FIG. 2 along the line 3B—3B.
Figures 3C, 3D, 4:
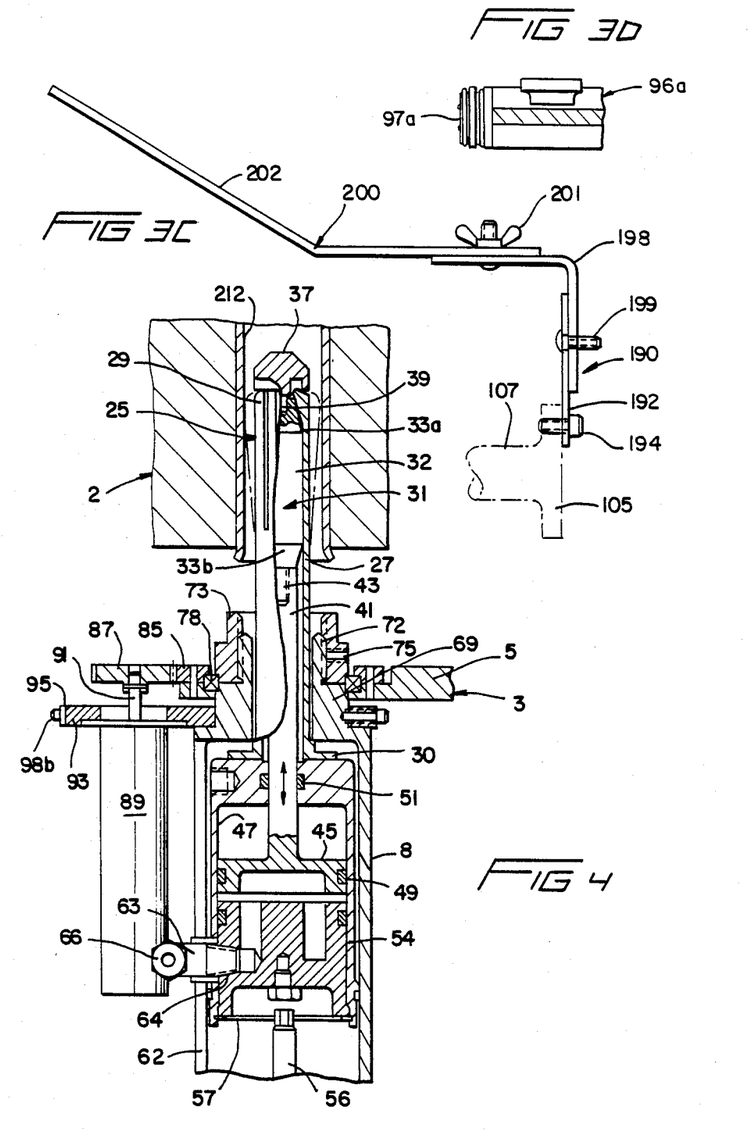
FIG. 3C is a side view of the television monitor mounting arm that attaches onto the top plate of the frame of the apparatus illustrated in FIG. 3A.
FIG. 3D is an enlarged partial cross sectional view of one of the control switches used in the apparatus.
FIG. 4 is an enlarged, cross-sectional side view of the mounting mechanism used to detachably mount the apparatus illustrated in FIG. 2 onto the tubesheet of a nuclear steam generator.

As may best be seen in FIGS. 1 and 4, the mounting mechanism 25 includes the previously mentioned securing collet 27 for detachably mounting the tool 1 to the interior of a first heat exchanger tube 212. The top end of this securing collet 27 is split into a plurality of expandable fingers 29, while the bottom end terminates in a mounting flange 30 that is connected to the upper surface of a collet expansion cylinder 47. Located within the interior of the securing collet 27 is a cam actuator 31 having a cylindrical central portion 32 that terminates in top and bottom frustroconical ends 33a, 33b. The upper portion of the resilient fingers 29 includes a taper that is complementary in shape to the frustroconical surface of the upper end 33a for a purpose which will be described in more detail presently. A tapered nosepiece 37 is connected to the top of the upper frustroconical end 33a by a threaded stud 39, while an actuator shaft 41 is connected to the bottom surface of the lowermost frustroconical end 33b by means of threaded stud 43. The actuator shaft 41 is in turn connected to the piston 45 of the previously mentioned collet-expansion cylinder 47. An O-ring 49 circumscribes the piston 45 in order to create an air-tight seal between the piston 45 and the cylinder 47. Additionally, a shaft seal 51 is provided at the upper end of the cylinder 47 to create an air-tight seal between this shaft 41 and the upper walls of cylinder 47.

The entire collet-expansion cylinder 47 is concentrically disposed within the tubular housing 8. The bottom of the expansion cylinder 47 is connected to the rod 56 of a hydraulic translation cylinder 58 by means of a snap ring assembly 57. In the preferred embodiment, the hydraulic cylinder 58 is a double-action cylinder having an upper air coupling 59 as well as a lower air coupling (not shown). Disposed on the top of the hydraulic cylinder 58 is a guide sleeve 60 that is engageable within a centrally disposed, threaded bore of a mounting cap 61 present at the lower end of the tubular housing 8. Like translation cylinder 58, the collet-expansion cylinder 47 includes an air coupling 63 for selectively injecting or relieving compressed air from the bottom of the piston 45. At its outer end, the air coupling 63 extends through an elongated slot 62 provided along the side of the tubular housing 8. On its inner end, the air coupling 63 includes a threaded exterior that may be screwed into the bottommost portion of the collet-expansion cylinder 47. A guide collar 69 is provided at the uppermost portion of the tubular housing 8 to guide the longitudinal motion of the securing collet 27. This guide collar 69 terminates in a threaded nipple that in turn receives an internally threaded spacing collar 73. As will be seen presently, this spacing collar 73 works in concert with a spacing lug 74 located at the opposite end of the upper support plate 5 to uniformly space the plate 5 from the bottom surface of the generator tubesheet 2. In closing, it should be noted that an upper bearing 78 pivotally connects the spacing collar 73 and upper end of the tubular housing 8 with the upper support plate 5, while a lower bearing 80 pivotally connects the lower end of the tubular housing 8 with the lower support plate 7. Hence the upper and lower bearings 78, 80 render the mounting mechanism 25 and the tubular housing 8 pivotally movable with respect to the rest of the frame 4.

In operation, the collet expansion cylinder 47 extends or retracts the individual fingers 29 of the expansion collet 27 by sliding the upper frustroconical end 33a of the cam actuator 31 into or away from the upper, tapered portions of the fingers 29, respectively. Independent of this mechanical action, the translation cylinder 58 extends or withdraws the securing collet 27 away from or toward the frame 4 of the tool by translating the entire collet expansion cylinder 47 along the longitudinal axis of the tubular housing 8. When the tool 1 is first mounted within a tube 212 of a tubesheet 2, the translation cylinder 58 positions the collet-expansion cylinder 47 at its uppermost position with respect to the tubular housing 8 as illustrated in FIG. 4. In order to secure the tool 1 within the tubesheet 2, compressed air is admitted through the air coupling 63 to push the actuator shaft 41 upwardly, thereby spreading the resilient fingers 29 of the collet 27 into the position shown in phantom, and engaging them against the inner wall of the tube 212. Thus positioned, neither the spacing lug 74 nor any other part of the upper support plate 5 contacts any portion of the tubesheet 2, and the entire frame 4 of the tool 1 is free to rotate about the center axis of the securing collet 27 without mechanical interference. However, once the chamfered opening 114 of the advancing mechanism 100 is aligned with the tube 214 to be sleeved, the translation cylinder 58 is actuated to withdraw the collet expansion cylinder 47 downwardly from the position illustrated in FIG. 2, thereby pulling the entire frame 4 toward the tubesheet 2 until the spacing collar 73 engages the flared open end of the tube 212. When this happens, the spacing lug 74 likewise engages the lower surface of the tubesheet 2, thereby creating a stable, multi-point contact between the upper support plate 5 of the frame 4 and the lower surface of the tubesheet 2.

In order to pivotally move the frame 4 around the securing collet 27 of the mounting assembly 25, a drive train 83 is provided. This drive train 83 is formed from a ring gear 85 that circumscribes the spacing collar 73 of the mounting assembly 25. The ring gear 85 meshes with a drive gear 87 that is in turn powered by the shaft 91 of a reversible electric motor 89. The motor 89 is in turn secured onto the upper support plate 5 by a motor mounting bracket 93.

As may best be seen with respect to the FIG. 3A, a clockwise motion of the shaft 91 of the electric motor 89 will cause the top support plate 5 of the frame 4 to move in a counterclockwise direction, while the reverse is true if the electric motor 89 is driven in a counterclockwise direction. Mounted on the back of the motor mounting bracket 93 is a switch bracket 95. The switch bracket 95 supports a pair of sensor switches 96a, 96b on the left and right hand sides of the motor mounting bracket 93, respectively. Each of the sensor switches 96a, 96b includes a resilient contact member 97a, 97b, best seen in FIG. 3D. The switch bracket 95 is in turn secured onto the back of the motor mounting bracket 93 by means of a pair of screws 98a, 98b. In operation, the sensor switches 96a, 96b provide a signal to the operator whenever the upper support plate 5 of the frame 4 is pivoted to its maximum clockwise or counterclockwise position. Specifically, when the plate 5 is pivoted to its maximum clockwise position, the plate depresses the contact member 97a of the switch 96a, while the same is true of contact member 97b when the plate 5 assumes its maximum counterclockwise position.

With reference now to FIGS. 2, 3A, and 3B, the advancing assembly 100 of the tool 1 includes an upper gripper 102 and a lower gripper 104. The upper gripper 102 is stationarily mounted between the upper and lower support plates 5, 7 of the frame 4. The bottommost portion of the upper gripper 102 is secured onto the lower support plate 7 by screws 142, while the uppermost portion is connected to the upper support plate 5 by way of a top guide tube 107 and a bottom guide tube 109 that are in turn colinearly connected together.

The top guide tube 107 includes an upper mounting flange 111 that is connected to the lower surface of the upper support plate 5 by means of screws 113. In order to provide an unobstructed guideway for a sleeve-loaded mandrel 189, the cylindrical interior of the top guide tube 107 is secured into alignment with a chamfered opening 114 located on the end of the upper support plate 5 opposite from the mounting mechanism 25. The top guide tube 107 also includes a lower mounting flange 115 that is connected to an upper mounting flange 117 of the bottom guide tube 109. In the preferred embodiment, a polyurethane centering pad 119 having a plurality of circumferential centering fingers 120 is sandwiched between the lower mounting flange 115 of the top guide tube 107 and the upper mounting flange 117 of the bottom guide tube 109. These centering fingers 120 help to align the sleeve-loaded mandrel 189 with the chamfered opening 114 in the upper support plate 5 when the advancing assembly 100 feeds the mandrel 189 through the top and bottom guide tubes 107, 109. The flanges 115, 117 are secured together by means of screws 121 as indicated. The bottom guide tube 109 has a lower mounting flange 123 that is connected to an upper retaining ring of the upper gripper 102 by means of screws 127. To grip the sleeve-loaded mandrel 189, the interior of the upper gripper 102 is lined with a resilient bladder 129 that may be selectively expanded into engagement with the mandrel 189 by compressed air in a manner which will be described in more detail hereinafter. In the preferred embodiment, the resilient bladder 129 is injection molded from Pelethane ®, compound No. 2363-80A available from the CPR Division of Upjohn Chemicals, Inc. located in LaPorte, Texas. The central portion of the resilient bladder 129 is tubular, w676 hile the end portions terminate in upper and lower sealing flanges 130a, 130b. These upper and lower sealing flanges 130a, 130b are received into annular recesses present around the ends of the cylindrical housing 131 which forms the exterior of the gripper 102. When the resilient bladder 129 is mounted within the cylindrical housing 131 in the position illustrated in FIG. 2, the tubular central portion of the bladder 129 is spaced a small distance away from the inner wall of the cylindrical housing 131 to form an annular space 137. In order that pressurized air may be conducted to the annular space 137, the housing 131 includes a transversely disposed threaded bore for receiving an air coupling 135. When pressurized air is admitted into the annular space 137, the bladder flexes into the gripping position shown in phantom. Conversely, when the annular space 137 is relieved of this pressurized air, the bladder 129 reassumes its unflexed, non-gripping shape. In order to sealingly engage the upper and lower sealing flanges 130a, 130b of the resilient bladder 129 against the upper and lower ends of the cylindrical housing 131, both a lower retaining ring 140 and an upper ring 148 are provided on the top and bottom of the housing 131, respectively. Both the lower and upper retaining rings 140, 148 are secured in place by means of screws 142, 127. It should be noted that the cylindrical interior of the bladder 129 of the lower gripper 102 is positioned into alignment with the chamfered opening 144 located in the lower support plate 7.

Like the upper gripper 102, the lower gripper 104 also includes an upper retaining ring 148 that is secured onto a cylindrical housing 150 by means of screws 151. Likewise, an air coupling 152 is provided at approximately the middle of this housing 150. Finally, a lower retaining ring 154 is sandwiched between the lower end of the cylindrical housing 150 and a reciprocating plate 156 upon which the lower gripper 104 rests. The lower retaining ring 154 is secured onto the lower end of the cylindrical housing 150 by screws in the manner previously described. Since the internal structure of the lower gripper 150 is identical to the internal structure of the upper gripper 102, no further description of the lower gripper 104 need be made.

The reciprocating plate 156 of the advancing assembly 100 is connected at one end to the output rod 160 of a reciprocating cylinder 162. In the preferred embodiment, reciprocating cylinder 162 is a model No. MRS-096-DXPZ double-action hydraulic cylinder manufactured by the Bimba Manufacturing Company located in Monee, Ill. This particular model of hydraulic cylinder has a magnetized piston head (not shown) for a control function which will be discussed in detail hereinafter. The bottom end of the reciprocating cylinder 162 includes the previously mentioned output rod 160 which is connected to the reciprocating plate 156 by way of a nut 164. The upper end of the reciprocating cylinder 162 terminates in a threaded fitting 166 that allows the cylinder 162 to be secured onto the upper support plate 5 of the frame 4 by means of a lock nut 168. As may best be seen in FIG. 3A, the lock nut 168 includes a pair of bores 169a, 169b for receiving a pair of retaining screws (not shown). The reciprocating cylinder 162 also includes top and bottom air fittings 170a, 170b, respectively, for injecting pressurized air against the top and bottom faces of the magnetic piston contained therein. As is again best seen with respect to FIG. 3B, a switch mounting rail 172 is secured along one side of the reciprocating cylinder 162 along its longitudinal axis. A magnetic switch (not shown) is slidably mounted onto this switch rail 172 so that, during the operation of the device, the strokes of the magnetic piston contained within the reciprocating cylinder 162 can be positively monitored.

In order to guide the bottom gripper 140 in a straight path during its reciprocatory motion, the reciprocating plate 156 upon which the gripper 104 is connected is slidably mounted upon a pair of parallel guide rods 174a, 174b. These guide rods 174a, 174b are best seen with reference to FIGS. 2 and 3. The top ends of each of these guide rods 174a, 174b are secured within recesses present in the bottom support plate 7 by means of screws 176a, 176b. The bottom ends of the guide rods 174a, 174b are similarly secured in recesses present in a mandrel guide plate 178 by means of screws 180a, 180b. In order to minimize friction between the guide rods 174a, 174b and the reciprocating plate 156, a pair of linear bearing assemblies 182a, 182b are mounted on the plate 156 as shown.

A braided stainless steel guide tube 185 is mounted onto the previously mentioned guide plate 178 in alignment with the chamfered entrance of the lower gripper 104. The purpose of the guide tube 185 is to guide a sleeve-loaded hydraulic mandrel 189 into the lowermost gripper 104 of the advancing assembly 100. In the preferred embodiment, the braided stainless steel guide tube 185 is long enough so that the operator of the tool 1 can slide a sleeve-loaded mandrel from a position outside of the bowl-shaped vessel that forms the primary side of the nuclear steam generator 3 all the way to the position illustrated in FIG. 2. For most models of steam generator, this corresponds to a length of approximately eight to ten feet.

With reference now to FIG. 3C, a camera-mounting assembly 190 is provided on the tool 1 for mounting a miniaturized television camera 191 in approximately the position illustrated in FIG. 3A. The camera mounting assembly 190 includes a flat mounting bracket 192 that is secured on the upper surface of the top support plate 5 by means of screws 194 and 196. This flat mounting bracket 192 is in turn connected onto one end of a right-angle bracket 198 by a rivet 199. The other end of the right-angle bracket 198 is connected onto a mounting arm 200 by means of a wing-nut 201. This mounting arm 200 has an offset portion 202 that includes a slot (not shown) for mounting the camera 191 into a position aligned with a viewing slot 207 present in the upper support plate 5 of the frame 4.

In operation, the tool 1 is remotely manipulated into the bowl-shaped vessel that forms the primary side of the nuclear steam generator 3 by means of the previously described robotic arm 19. Once the operator of the tool 1 has selected a particular tube 214 for sleeving, he selects a mounting tube 212 that is the same distance to the tube (or tubes) 212 to be sleeved as the radial distance R between the center line of the securing collet 27 and the chamfered opening 114 of the advancing assembly 100. To simplify this step in the method of operation of the invention 1, the radial distance R between the securing collet 27 and the opening 114 will correspond to a multiple of the square pitch distance between the individual tubes, for example, three such square pitch distances. Such dimensioning also insures that the chamfered opening 114 will be alignable with a maximum number of tubes 214 in the tubesheet 2 for any given tube 212, which in turn minimizes the frequency with which the entire tool 1 will have to be repositioned on the tubesheet 2 during any given sleeving operation.

After the operator of the tool 1 has selected a securing tube 212, he manipulates the robotic arm 19 so that the resilient fingers 29 of the securing collet 27 are completely extended up into the mouth of the tube 212 in the position illustrated in FIG. 4. He then actuates the collet-expansion cylinder 47 by admitting pressurized air through air coupling 63. The admission of such pressurized air has the effect of pushing the piston 45 upwardly, which in turn pushes the upper, frustroconical end 33a of the cam actuator 31 against the tapered ends of the resilient fingers 29. This, in turn, causes the fingers to expand outwardly into engagement with the inner walls of the tube 212 in the position indicated in phantom.

During each of the foregoing steps, the rod 56 of the translation cylinder 58 has been extended so that the expansion cylinder 47 is in the uppermost position illustrated in FIG. 4, with the mounting flange 30 of the collet 27 adjacent to the bottom surface of the guide collar 69.

Once the tool 1 has been secured into engagement within tube 212 of the tubesheet 2, the robotic arm 19 is de-coupled from the mounting bracket 9 by hydraulically withdrawing the locking pin 21 into the position illustrated in FIG. 2. Since the locking pin 21 no longer transversely extends through the bore 15 in the wedge 11, the cup 17 may be freely withdrawn from around the wedge 11, and the robotic arm 19 may be retracted from the tool 1.

At this juncture, the electric motor 89 of the drive train 83 is actuated in order to pivot the frame 4 about the center line of the securing collet 27 until the chamfered opening 114 of the advancing assembly 100 is aligned with the open end of the tube 214 to be sleeved. During this step, the television camera 191 is used to monitor the relative positions of the chamfered opening 114, and the tube to be sleeved 214. When alignment is attained, the motor 89 of the drive train 83 is deactuated.

Following the alignment step, the operator of the device loads a sleeve 187 around an expansion mandrel 189 outside of the radioactive interior of the primary side of the nuclear steam generator 3. The loading step is achieved by simply sliding such a reinforcing sleeve 187 around the mandrel 189. The expansion mandrel 189 includes either one or more sets of resilient O-rings or a cylindrical bladder (not shown) around its exterior surface that will engage the interior surface of the sleeve 187 and frictionally hold it in place when hydraulic pressure at low pressure is introduced therein.

In the next step, a technician slides the sleeve-loaded mandrel 189 into the open end of the guide tube 185 that extends outside the bowl-shaped vessel of the primary side of the generator 3. The expansion mandrel 189 is connected to a hydraulic hose 189:1 which the operator may use to push the sleeve-loaded mandrel 189 through the length of the guide tube 185 into the position illustrated in FIG. 2. Once the sleeve-loaded mandrel 189 has been so positioned, the advancing assembly 100 is actuated, which in turn reciprocates the lower gripper 104 between the bottom of the lower support plate 107, and the top of the guide plate 187. The expansion and retraction of resilient bladders 129 present within the upper and lower grippers 102 is coordinated so that the sleeve-loaded mandrel 189 is gripped by the lower gripper 104 and incrementally fed through the advancing assembly 100 and into the open end of the tube 214 to be sleeved. The distance that the sleeve-loaded mandrel 189 is advanced into the tube 214 to be sleeved may be calculated by either counting the number of strokes of the reciprocating cylinder 162 of the assembly 100 over time, or by observing the position of the bottom edge of the sleeve 187 with respect to the open end of the tube 214 being sleeved. When the sleeve-loaded mandrel 109 has been fed into a position across the corroded section of the tube, the advancing assembly 100 is deactuated, and the hydraulic mandrel 189 is used to expand the sleeve into place across the corroded section of the tube, thereby installing a hydraulic "bridge" across the weakened sections of the tube 214.

Every sleeve along the arcuate path traced by the pivotally movable chamfered opening 114 of the advancing assembly is likewise sleeved. The tool is then re-positioned by the robotic arm 19, and the sleeving process is continued until completed.

We claim:

1. An apparatus for remotely inserting and positioning an elongated component within a selected one of the uniformly spaced open-ended tubes mounted in a tubesheet, comprising a frame means, mounting means for detachably and pivotally suspending the frame means from a tube in the tubesheet, an advancing assembly mounted onto and supported by the frame means a fixed distance away from the mounting means for remotely inserting and advancing said elongated component to a selected position along the longitudinal axis of the selected tube, wherein said fixed distance is selected so that said advancing assembly is alignable with the open end of more than one tube when said mounting means detachably suspends said frame means from one of said open ended tubes, and drive means for pivotally moving the frame means around the mounting means and thereby positioning the advancing assembly into alignment with the open end of the selected tube.

2. The apparatus of claim 1, wherein the mounting means includes a securing means for detachably securing the frame means to the open end of said tube, and a bearing means for pivotally mounting the securing means to the frame means.

3. The apparatus of claim 2, wherein said securing means includes displacement means for selectively moving the frame means from a nonabutting to an abutting position with respect to the tubesheet so that the advancing means may be freely pivoted into alignment with said selected tube without mechanical interference, and then abutted against the open end of the second tube once alignment therewith is achieved.

4. The apparatus of claim 1, wherein the drive means includes a drive train including a plurality of gears and a motor means.

5. The apparatus of claim 4, wherein one of the gears of the drive train circumscribes the mounting means.

6. The apparatus of claim 1, wherein the elongated component includes a reinforcement sleeve.

7. The apparatus of claim 1, wherein the elongated component includes an expansion mandrel connected to a flexible conduit.

8. The apparatus of claim 1, wherein said advancing assembly includes first and second selectively actuatable grippers, at least one of which is reciprocably movable with respect to the other.

9. The apparatus of claim 8, wherein each of said grippers includes a fluidly expandable bladder.

10. An apparatus for remotely inserting and positioning an elongated maintenance component within a selected one of the elongated open-ended tubes mounted in a tubesheet, wherein said tubes are uniformly spaced apart, comprising
 a. a frame means;
 b. a mounting means for detachably and pivotally suspending the frame means from a tube in the tubesheet including a securing means that is expandibly securable within the open end of a first tube, and a bearing means for rotatably mounting the securing means to the frame means;
 c. an advancing assembly mounted onto and supported by the frame means a fixed distance away from the mounting means for remotely inserting and advancing said elongation maintenance component to a selected position along the longitudinal axis of a second tube, wherein said fixed distance is selected so that said advancing assembly is alignable with the open end of more than one of the uniformly spaced tubes when said mounting means mounts said frame means to one of said open ended tubes, and
 d. means for pivotally positioning the advancing assembly into alignment with the open end of the second tube.

11. The apparatus of claim 10, further including control means for monitoring the position of the advancing assembly with respect to the open end of the second tube.

12. The apparatus of claim 11, wherein said control means includes a television camera mounted on the frame means.

13. The apparatus of claim 10, wherein said securing means includes displacement means for selectively moving the frame means from a noncontacting to a contacting position with respect to the tubesheet so that the advancing assembly may be freely pivoted into alignment with said second tube without mechanical interference, and then abutted adjacent to the open end of the second tube once alignment therewith is achieved.

14. The apparatus of claim 10, wherein said maintenance component includes an expansion mandrel circumscribed by a reinforcing sleeve.

15. The apparatus of claim 10, wherein said means for pivotally positioning the advancing assembly includes a drive train having a gear that circumscribes the securing means, and a motor means for driving the gear.

16. The apparatus of claim 10, wherein said advancing assembly includes first and second selectively actuatable grippers, at least one of which is reciprocably movable with respect to the other.

17. The apparatus of claim 16, wherein each of said grippers includes a fluidly expandable bladder.

18. The apparatus of claim 17, wherein said advancing assembly includes a guide means for axially aligning the elongated maintenance component into engagement with the reciprocating gripper.

19. The apparatus of claim 10, further including coupling means for detachably coupling the frame means to a robotic arm.

20. An apparatus for remotely inserting and an expansion mandrel and a reinforcing sleeve across a damaged section of a tube having an open end that is mounted in a tubesheet which includes a plurality of open-ended tubes uniformly spaced from one another comprising:
   a. a frame means having a top plate and a bottom plate;
   b. a mounting means for detachably and pivotally suspending the frame means from a tube in the tubesheet including a securing means that is expandably securable with the open end of a first tube in the tubesheet, and a bearing means for pivotally mounting the securing means to the frame means.
   c. an advancing assembly for remotely inserting and incrementally advancing the mandrel and sleeve to a position across the damaged section of a second tube, wherein said assembly includes a first gripper mounted on the bottom plate of the frame means a selected radial distance away from the bearing means so that said first gripper is alignable with the open end of more than one of the uniformly spaced tubes when said mounting means mounts said frame means to one of said open ended tubes 1, and a second gripper slidably mounted on the frame means in axial alignment with the first gripper, and means for reciprocably moving said second gripper with respect to the first gripper, and
   d. a drive means for pivotally moving the first gripper of the advancing assembly into alignment with the second tube, including a drive train having a gear that is concentrically disposed around the securing means, and a motor means for driving the drive train so that the top plate of the frame means rotates and pivotally positions the first gripper of the advancement assembly into alignment with the open end of the second tube.

wherein said securing means has a displacement means for selectively moving the top plate of the frame means from spaced position to an adjacent position after said first gripper of the advancing assembly has been aligned with the second tube.

21. The apparatus of claim 20, wherein said means for reciprocably moving said second gripper with respect to the first gripper includes a double-action hydraulic cylinder.

22. The apparatus of claim 20, further having a control means that includes a television camera mounted on the frame means for informing an operator as to the relative positions of the first gripper of the advancementassembly and the open end of thedamaged tube.

23. The apparatus of claim 20, wherein said mandrel is connected to a flexible power conduit, and wherein each gripper includes an expandable bladder that is expandably engageable with both the mandrel and the flexible power conduit.

24. A method for positioning an elongated component within selected ones of the open-ended and uniformly spaced tubes mounted in a tubesheet with a positioning apparatus that includes a frame means, a mounting means for detachably and pivotally attaching the frame means to the open end of a tube in the tubesheet, and an advancing assembly that is support by and mounted on the frame means a selected radial distance from the mounting means so that said advancing assembly is pivotally alignable with the open end of more than one tube when said mounting means mounts said frame means to a tube in the tubesheet, comprising the steps of:
   a. remotely attaching the mounting means of the positioning apparatus to the open end of a first tube in the tubesheet so as to suspend said apparatus from said tubesheet;
   b. pivoting the frame means around the mounting means until the advancing assembly is placed into alignment with the open end of a first selected tube;
   c. inserting and advancing the elongated component within the first selected tube until said component is placed at a selected position along the longitudinal axis of the selected tube, and
   d. pivoting the frame means around the mounting means until the advancing assembly is placed into alignment with the open end of a second selected tube, and inserting and advancing an elongated component into said second selected tube.

25. The method of claim 24, further including the step of visually monitoring the position of the advancing assembly with respect to the selected tubes, and remotely stopping the pivotal motion of the frame means around the mounting means when a visual alignment between the advancing assembly and the open end of a selected tube has been attained.

26. The method of claim 24, wherein said mounting means includes a displacement means for selectively moving the frame means from a noncontacting to a contacting position with respect to the tubesheet, and wherein said frame means is in said noncontacting position when it pivots around the mounting means, and is displaced into said contacting position when said advancing assembly is aligned with the open end of a selected tube.

27. The method of claim 26, wherein said advancing assembly includes first and second grippers, the second of which is reciprocably movable with respect to the first, and said component is advanced by
   a. gripping said component with said first gripper;
   b. ungripping said component with said first gripper and gripping said component with said second gripper while reciprocably moving said second gripper closer to said first gripper;
   c. gripping said component with said first gripper and ungripping said component with said second gripper while reciprocably moving said second gripper further away from said first gripper, and
   d. repeating steps b. and c. until said component is placed in a desired position along the longitudinal axis of the selected tube.

28. The method of claim 24, wherein said positioning apparatus is detachably coupled to a robotic arm, and wherein the mounting means is attached to the open end of said first tube by remotely manipulating said position apparatus by the robotic arm until said mounting means is inserted within and attached to said tube end, whereupon said arm is decoupled from said positioning apparatus.

29. A method for positioning a reinforcing sleeve and an expansion mandrel within selected ones of the open-ended tubes mounted in a tubesheet by means of a positioning apparatus that includes a frame means, a mounting means for both detachably and pivotally attaching the frame means to the open end of a tube in the tubesheet, wherein said mounting means includes a displacement means for selectively moving the attached frame means from a concontacting position with respect to the tubesheet to contacting position, and an advancing assembly that is supported by the frame means a selected radial distance away from the mounting means such that said advancing assembly is pivotally alignable with the open end of each of said selected open-ended tubes when said mounting means mounts said frame means to a tube in the tubesheet, comprising the steps of:

a. remotely attaching the mounting means of the positioning apparatus to the open end of a first tube in the tubesheet so as to suspend said apparatus from said tubesheet;

b. remotely pivoting the frame means around the mounting means with the frame means in said noncontacting position with respect to the tubesheet until the advancing assembly is aligned with the open end of a first selected tube;

c. stopping the pivotal movement of the frame means;

d. moving the frame means toward the tubesheet into said contacting position through the displacement means so that the advancing assembly is adjacent to the open end of the first selected tube;

e. loading a sleeve around an expansion mandrel that is connected to a flexible, power-conducting conduit on one end and partially actuating said mandrel to engage with sleeve thereto;

f. feeding the sleeve and mandrel combination into the advancing assembly;

g. actuating the advancing assembly until the sleeve and mandrel are placed at a desired point along the longitudinal axis of the selected tube, and h. pivoting the frame means around the mounting means until the advancing assembly is placed into alignment with the open end of a second selected tube, and inserting and advancing an elongated component into said second selected tube.

30. The method of claim 29, further including the step of visually monitoring the position of the advancing assembly with respect to the selected tube, and remotely stopping the pivotal motion of the frame means around the mounting means when a visual alignment between the advancing assembly and the open end of the selected tube has been attained.

31. The method of claim 30, wherein said advancing assembly includes first and second grippers, the second of which is reciprocably movable with respect to the first, and said sleeve-loaded mandrel is advanced by a. gripping said sleeve-loaded mandrel with said first gripper;

b. ungripping said sleeve-loaded mandrel with said first gripper and gripping said sleeve-loaded mandrel with said second gripper while reciprocably moving said second gripper closer to said first gripper;

c. gripping said sleeve-loaded mandrel with said first gripper and ungripping said sleeve-loaded mandrel with said second gripper while reciprocably moving said second gripper further away from said first gripper, and d. repeating steps b. and c. until said sleeve-loaded mandrel is placed in a desired position along the longitudinal axis of the selected tube.

32. The method of claim 29, wherein said positioning apparatus is detachably coupled to a robotic arm, and wherein the mounting means is attached to said tube end by remotely manipulating said positioning apparatus by the robotic arm until said mounting means is inserted within and attached to said tube end, whereupon said arm is de-coupled from said positioning apparatus.

* * * * *